United States Patent
Belot et al.

(10) Patent No.: US 11,588,514 B2
(45) Date of Patent: Feb. 21, 2023

(54) SYSTEM FOR BIDIRECTIONAL TRANSMISSION OF SIGNALS IN A PLASTIC WAVEGUIDE

(71) Applicant: COMMISSARIAT A L'ENERGIE ATOMIQUE ET AUX ENERGIES ALTERNATIVES, Paris (FR)

(72) Inventors: Didier Belot, Grenoble (FR); Baudouin Martineau, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 17/399,109

(22) Filed: Aug. 11, 2021

(65) Prior Publication Data

US 2022/0060214 A1  Feb. 24, 2022

(30) Foreign Application Priority Data

Aug. 18, 2020  (FR) ...................... 2008552

(51) Int. Cl.
*H04B 1/50* (2006.01)
*H04L 27/12* (2006.01)
*H04B 3/06* (2006.01)
*H01P 3/16* (2006.01)

(52) U.S. Cl.
CPC ................ *H04B 1/50* (2013.01); *H01P 3/16* (2013.01); *H04B 3/06* (2013.01); *H04L 27/12* (2013.01)

(58) Field of Classification Search
CPC ... H04B 1/40; H04B 3/06; H04B 1/38; H04B 3/52; H04B 1/50; H04L 27/12; H01P 3/16; G02B 6/28
See application file for complete search history.

(56) References Cited

U.S. PATENT DOCUMENTS

| 11,005,150 | B2  | 5/2021  | Voineau et al. |
| 2012/0207195 | A1* | 8/2012 | Kawasaki ................ H04B 1/04 375/219 |
| 2017/0331181 | A1  | 11/2017 | Belot et al. |
| 2018/0183561 | A1* | 6/2018  | Dogiamis ................ H04B 3/52 |

(Continued)

FOREIGN PATENT DOCUMENTS

| EP | 3 453 071 A1 | 3/2019 |
| WO | 2018/125479 A1 | 7/2018 |

OTHER PUBLICATIONS

Voineau, et al., "A 12 GB/s 64QAM and OFDM compatible millimeter-wave communication link using a novel plastic waveguide design", 2018 IEEE Radio and Wireless Symposium (RWS), pp. 250-252, 2018.

(Continued)

*Primary Examiner* — Aristocratis Fotakis
(74) *Attorney, Agent, or Firm* — BakerHostetler (57) ABSTRACT

A system for bidirectional transmission in a plastic waveguide of a plurality of signals, between a first transceiver device and a second transceiver device, the plurality of signals comprising a payload carrier signal and one or more reference signals generated by one or more local oscillators on different frequencies, the first transceiver device being a power radio transceiver device, the second transceiver device being a multisignal transceiver device with no energy consumption which comprises a passive transmitter and a passive receiver.

12 Claims, 3 Drawing Sheets

(56) References Cited

U.S. PATENT DOCUMENTS

| | | | |
|---|---|---|---|
| 2018/0210079 | A1 | 7/2018 | Hammerschmidt et al. |
| 2020/0136726 | A1* | 4/2020 | Tam ........................ H04B 3/52 |
| 2020/0169444 | A1* | 5/2020 | Tam .................... H04L 27/2647 |
| 2020/0194863 | A1 | 6/2020 | Bennett et al. |
| 2020/0250568 | A1* | 8/2020 | Hua ........................ H03K 3/38 |
| 2022/0029645 | A1* | 1/2022 | Säily ........................ H04B 1/18 |
| 2022/0038136 | A1* | 2/2022 | Cabrol ................. H04B 17/336 |
| 2022/0045416 | A1* | 2/2022 | Naaman .................. H01P 5/184 |

OTHER PUBLICATIONS

Wit, et al., "Analysis and Design of a Foam-Cladded PMF Link With Phase Tuning in 28-nm CMOS", IEEE Journal of Solid-State Circuits, vol. 54, No. 7, pp. 1960-1969, 2019.

Jany, e al., "A novel harmonic selection technique based on the injection of a periodically repeated oscillations train into an oscillator", IEEE MTT-S International Microwave Symposium (IMS2014), pp. 1-3, 2014.

Jany, e al., "A novel ultra-low phase noise, programmable frequency multiplier-by-30 architecture. Application to 60-GHz frequency generation", ESSCIRC, pp. 427-430, 2014.

Parment, et al., "Air-filled substrate integrated waveguide for low loss and high power handling millimetre-wave substrate integrated circuits", IEEE Transactions on Microwave Theory and Techniques, vol. 63, No. 4, pp. 1228-1238, Apr. 2015.

Sawaby, et al., "A Fully Packaged 130-GHz QPSK Transmitter With an Integrated PRBS Generator", IEEE Solid-State Circuits Letters, vol. 1, No. 7, pp. 166-169, Jul. 2018.

Thienen, et al., "An 18Gbps Polymer Microwave Fiber (PMF) Communication Link in 40nm CMOS", ESSCIRC (ESSCIRC), pp. 483-486, 2016.

Voineau, et al., "A 12 GB/s 64QAM and OFDM Compatible Millimetre-Wave Communication Link Using a Novel Plastic Waveguide Design", IEEE Radio and Wireless Symposium (RWS), pp. 250-252, 2018.

* cited by examiner

SYSTEM FOR BIDIRECTIONAL TRANSMISSION OF SIGNALS IN A PLASTIC WAVEGUIDE

CROSS-REFERENCE TO RELATED APPLICATIONS

This application claims priority to foreign French patent application No. FR 2008552, filed on Aug. 18, 2020, the disclosure of which is incorporated by reference in its entirety.

FIELD OF THE INVENTION

The invention relates generally to transmission systems and, in particular, to a system based on a plastic waveguide for bidirectional transmission of a plurality of signals between a first transceiver device and a second transceiver device.

BACKGROUND

The waves that have frequencies of between 1 GHz and 10 THz are non-ionizing radiation which can penetrate a wide range of non-conductive materials such as wood, plastic, ceramics and paper. The transmission of such waves allows for new applications in various technical fields such as spectroscopy, physics, communications, imaging, the medical field, and biology.

The existing waveguides for guiding the electromagnetic waves in other frequency ranges cannot be adapted for the propagation of such waves. Several alternative solutions have been proposed to allow the propagation of such waves. In particular, waveguides made of plastic material have been proposed in:

M. De Wit, Y. Zhang and P. Reynaert, "Analysis and Design of a Foam-Cladded PMF Link With Phase Tuning in 28-nm CMOS", in IEEE Journal of Solid-State Circuits, 2019;

C. Jany, A. Siligaris, P. Ferrari, and P. Vincent, "A novel harmonic selection technique based on the injection of a periodically repeated oscillations train into an oscillator", IEEE MTT-S International Microwave Symposium (IMS2014), Tampa, Fla., 2014, pp. 1-3;

C. Jany, A. Siligaris, J. L. Jiménez, C. Bernier, P. Vincent, and P. Ferrari, "A novel ultra-low phase noise, programmable frequency multiplier-by-30 architecture. Application to 60-GHz frequency generation", ESSCIRC, 2014, pp. 427-430;

F. Voineau, A. Ghiotto, and E. Kerhervé, "Ensemble pour la propagation d'ondes dans la gamme de fréquences comprises entre 1 GHz et 10 THz" [Assembly for the propagation of waves in the range of frequencies lying between 1 GHz and 10 THz], Patent Registration, FR 16 54003, May 2016;

F. Parment, A. Ghiotto, T. Vuong, J. Duchamp, and K. Wu, "Air-filled substrate integrated waveguide for low loss and high power handling millimetre-wave substrate integrated circuits", IEEE Transactions on Microwave Theory and Techniques, vol. 63, no. 4, pp. 1228-1238, April 2015;

M. Sawaby, N. Dolatsha and A. Arbabian, "A Fully Packaged 130-GHz QPSK Transmitter With an Integrated PRBS Generator", in IEEE Solid-State Circuits Letters, 2018;

N. Van Thienen, Y. Zhang, M. De Wit, P. Reynaert, "An 18 Gbps Polymer Microwave Fiber (PMF) Communication Link in 40 nm CMOS", ESSCIRC (ESSCIRC), Lausanne, 2016, and F. Voineau, C. Dehos, B. Martineau, M. Sié, M. Perchicot, N. H. Nguyen, A. Ghiotto and E. Kerhervé, "A 12 Gb/s 64QAM and OFDM Compatible Millimetre-Wave Communication Link Using a Novel Plastic Waveguide Design", IEEE Radio and Wireless Symposium (RWS), Anaheim, Calif., 2018, pp. 250-252.

The plastic waveguides form thermal insulating links which allow wideband radio transmissions. The existing technologies, comprising the P-link technology, offer very high bit rate wideband links suitable for the networks of the future 5G and 6G generations and applications to smart transport systems and autonomous vehicles. The solutions thus developed based on plastic waveguides are based on links balanced at their ends, using the same transceivers on each side of the link. These solutions allow a single transmitted signal to be propagated without latency with an energy consumption balance between the transmitter and the receiver.

Contrary to some existing waveguides, the known solutions which use plastic waveguides allow the propagation of waves that have carrier frequencies of between 30 GHz and 10 THz, the payload signals carried by these carrier frequencies lying between 1 MHz and several tens of GHz, even more depending on the carrier frequency. However, these plastic waveguide-based solutions do not allow the simultaneous transmission of a plurality of signals and are not suited to certain applications such as Qubit addressing in a Quantum machine and the Internet of things embedded in material. The Quantum machines are currently based on the use of coaxial cables which represent drawbacks in terms of costs and energy efficiency. Indeed, the number of coaxial cables used between the interface at ambient temperature and the cryogenic interface is very high, which hampers strong integration of the overall system. Furthermore, since each coaxial signal is composed of a thermal conductor, it contributes to the heating up of the cryogenic zone, which greatly hampers the energy efficiency of the Quantum machine. For a large number of Qubits, it can also hamper the operation of the Quantum machine.

There is therefore a need for an enhanced system capable of propagating waves that have frequencies lying between 1 GHz and 10 THz and that are suitable for bidirectional transmission of a plurality of signals in an environment incompatible with radio transmissions.

SUMMARY OF THE INVENTION

The invention improves the situation. To this end, the invention provides a system as claimed in the independent claim.

Various embodiments are claimed in the dependent claims.

Advantageously, the embodiments of the invention provide a transmission system based on a plastic waveguide offering wideband bidirectional multiconnectivity, with a transmission of a plurality of signals comprising a payload signal and one or more reference sinusoidal signals generated by a local oscillator.

Advantageously, the embodiments of the invention make it possible to transport, in a plastic waveguide, simultaneously and bidirectionally, payload carrier signals as well as reference sinusoidal signals with different frequencies to avoid crosstalk.

Advantageously, the simultaneous radio transmission of a payload carrier signal (the carrier) and of the reference sinusoids (LOs) is a totally counter-intuitive approach. Indeed, in radio, the propagation paths are different, which then makes a synchronization of several signals on one receiver impossible. The invention eliminates this problem by transporting all the signals in one and the same plastic waveguide which exhibits the very interesting property of keeping the synchronization between the signals.

In an advantageous embodiment, the different frequencies for two reference sinusoidal signals LO1 and LO2 can be obtained by a first heterodyne conversion done with the product (LO1-LO2), then a second conversion using LO1.

In particular, in an application of the invention to a Quantum machine, the embodiments of the invention make it possible to address a high number of transceivers with zero consumption on the Qubit side (at a temperature of 1 Kelvin or less), even with positive energy balance with a single source and a single medium in an environment incompatible with radio transmissions. The embodiments of the invention also make it possible to address a large number of Qubits while significantly reducing the number of connections between the interface at ambient temperature and the cooled volume interface, or cryogenic zone, where the Qubits are physically located, which enhances the energy efficiency of the Quantum machine.

The embodiments of the invention also make it possible to produce a Quantum machine using 100 Qubits and more, that can simultaneously take $2^{100}$ states on a chip while guaranteeing a temperature close to absolute zero on the Qubit side.

In an application of the invention to a Quantum machine, the embodiments of the invention provide a transmission system capable of transmitting all the Qubit manipulation and read information by using a single plastic waveguide, which allows the global integration of the Qubits and their addressing in a small volume with low energy consumption.

Some embodiments, applied also to the Quantum machine, allow a bidirectional multisignal transmission in a plastic waveguide with a passive transceiver on the cryogenic interface (interface at 1 Kelvin or less) where a transceiver device comprising a passive transmitter and a passive receiver is controlled by a transceiver device on the ambient temperature side.

In an application of the invention to connected things embedded in the infrastructure and in smart factories, the embodiments of the invention allow for a bidirectional multisignal transmission in a plastic waveguide linking sensors with zero energy consumption to a base station.

Advantageously, the plastic waveguide-based link, according to the embodiments of the invention, is a totally unbalanced link between the first transceiver device (located on the ambient temperature side in the Quantum machine application) and the second transceiver device (located on the cryogenic temperature side in the Quantum machine application).

In an application of the invention to a Quantum machine, the embodiments of the invention advantageously make it possible to replace the coaxial multilinks with a single plastic link by producing a very high frequency, completely thermally insulated and unbalanced link between the interface at ambient temperature and the cryogenic interface.

The reference signals can be reused to convert the signal carrying the Qubit manipulation signals and process the uploaded Qubit read information with a direct conversion, which makes it possible to reduce the losses due to the passive mixers and reduce the number of signals to be guided.

It is also possible to use the energy supplied by the signals coming from the base at ambient temperature to power the devices located in the cryogenic zone.

Advantageously, the embodiments of the invention allow the Qubit manipulation signals to descend from the zone at ambient temperature to the zone at cryogenic temperature and all of the manipulation signals to be restored.

Advantageously, the embodiments of the invention allow a complete integration of the Quantum machine while reducing the size and the thermal losses.

The use of a plastic waveguide according to the embodiments of the invention makes it possible to use networks of completely passive sensors, not limited by a battery charge duration, in isolated environments outdoors and/or with a lot of noise from electromagnetic interference.

Advantageously, by transmitting the radio carriers modulated by the payload signal and the reference sinusoidal signals simultaneously in a plastic waveguide, it is possible to transfer a wideband multiconnectivity in duplex mode, with zero-energy transceivers on the Qubit side (at a temperature of 1 Kelvin or less), or to address Internets of things with no energy source.

BRIEF DESCRIPTION OF THE DRAWINGS

Other features, details and advantages of the invention will become apparent on reading the description given with reference to the attached drawings that are given by way of example and which represent, respectively.

DETAILED DESCRIPTION

The embodiments of the invention provide a system for bidirectional transmission of a plurality of signals between a first transceiver device and a second transceiver device, the signals being advantageously able to have frequencies of between 1 GHz and 10 THz.

The embodiments of the invention can be used in various applications comprising, without limitation, the Internet of things (IoT) embedded in material or in the infrastructure with zero energy consumption (for example for the transmission of a plurality of signals between an IoT thing and an IoT server or a base station), transmissions with strong electromagnetic interference (like the smart factory or the Internet of things located in an environment subject to strong electromagnetic disturbances or in robots), and Qubit addressing in the Quantum machines.

Figure 1:
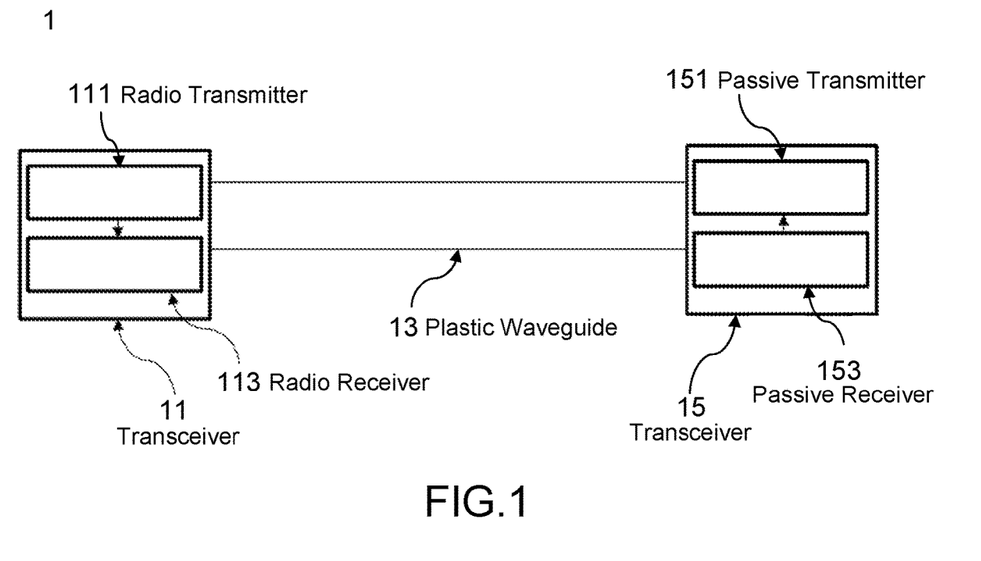
FIG. 1 is a diagram representing a system for bidirectional transmission of a plurality of signals between a first transceiver device and a second transceiver device, according to some embodiments of the invention.

FIG. 1 represents a system 1 for the bidirectional transmission of a plurality of signals between a first transceiver device 11 and a second transceiver device 15 according to the embodiments of the invention.

The plurality of signals transferred between the first transceiver device 11 and the second transceiver device 15 comprises a payload carrier signal and one or more reference signals generated by one or more local oscillators (designated LO).

According to the embodiments of the invention, the first transceiver device 11 comprises a multisignal power radio transmitter 111 configured to generate signals of millimetric frequencies and a multisignal power radio receiver 113 configured to restore the payload carrier signal transmitted by the second transceiver device 15.

According to some embodiments, the second transceiver device 15 comprises a passive receiver 153 with zero energy consumption (also referred to as "multisignal receiver without energy consumption") configured to restore the payload carrier signal transmitted by the first transceiver device 11 and a passive transmitter 151 with zero energy consumption (also designated "multisignal transmitter without energy consumption") configured to transmit at least one payload carrier signal to the first transceiver device 11.

According to some embodiments, the system comprises a plastic waveguide 13 linking the first transceiver device 11 to the second transceiver device 15 to guide the plurality of signals.

According to some embodiments, a frequency spacing at least equal to the width of the frequency band of the payload carrier signal can be maintained between the frequencies associated with said plurality of signals.

According to the applications of the invention, a payload carrier signal can correspond to a Qubit manipulation or read signal (in Quantum machine application), a control signal, or a wakeup signal (applied to the Internet of things and smart factories for example).

According to some embodiments, the plurality of signals transmitted from the first transceiver device 11 to the second transceiver device 15 can comprise a first payload carrier signal and one or more reference signals. According to these embodiments, the multisignal power radio transmitter 111 can be configured to generate a first signal designated $s_1$ and composed of a first carrier frequency designated $F_{c-1}$ modulated by a first payload carrier signal designated $Mod_1$ such that the first signal is written in the form $s_1 = F_{c-1} + Mod_1$. The multisignal power radio transmitter 111 can further comprise one or more local oscillators, each local oscillator being configured to generate a reference signal designating a reference sinusoid.

According to some embodiments, a frequency spacing at least equal to the width of the frequency band of the first payload carrier signal can be maintained between the frequencies of the reference signals and the frequency of the first payload carrier signal to avoid the creation of interference between the different signals guided in the plastic waveguide 13.

After generation of the first signal $s_1$ and of one or more reference signals, the multisignal power radio transmitter 111 can be configured to transmit the signals generated to the second transceiver device 15 through the plastic waveguide 13 simultaneously. The reference signals transmitted by the multisignal power radio transmitter 111 are used by the second transceiver device 15 to restore the first payload carrier signal without having to redefine the reference sinusoids. More specifically the passive receiver 153 is configured to receive the first signal $s_1$ and one or more reference signals transmitted by the multisignal power radio transmitter 111 and restore the first payload carrier signal $Mod_1$ through one or more conversions (designated "down conversions") by using the first signal $s_1$ and one or more conversion signals determined from one or more reference signals.

According to some embodiments, the passive receiver 153 can comprise one or more passive mixers configured to determine one or more conversion signals and to perform one or more downconversions.

According to some embodiments, the plurality of signals transmitted from the second transceiver device 15 to the first transceiver device 11 can comprise a second payload carrier signal designated $Mod_2$. According to these embodiments, the passive transmitter 151 can be configured to generate a second signal designated $s_2$ and composed of a second carrier frequency designated $F_{c-2}$ modulated by the second payload carrier signal $Mod_2$ such that the second signal is written in the form $s_2 = F_{c-2} + Mod_2$. The passive transmitter 151 can be configured to generate the second signal $s_2$ through one or more conversions (designated "upconversions") of the second payload carrier signal by using one or more direct conversion signals derived from one or more reference signals transmitted by the multisignal power radio transmitter 111, the passive transmitter 151 being configured to receive one or more reference signals, determine one or more direct conversion signals from said one or more reference signals, and perform said one or more direct conversions of the second payload carrier signal by using one or more direct conversion signals.

According to some embodiments, the passive transmitter 151 can comprise one or more passive mixers configured to determine one or more direct conversion signals and to perform one or more direct conversions.

After generation of the second signal $s_2$, the passive transmitter 151 can be configured to transmit the second signal $s_2$ to the first transceiver device 11 through the plastic waveguide 13. On reception of the second signal $s_2$, the multisignal power radio receiver 113 can be configured to restore the second payload carrier signal $Mod_2$ through one or more conversions of the second signal $s_2$ by using one or more reference signals generated by the multisignal power radio transmitter 111, the multisignal power radio receiver 113 being configured to receive said one or more reference signals from the multisignal power radio transmitter 111.

According to some embodiments, one or more reference signals generated by the multisignal power radio transmitter 111 can comprise a first reference signal designated $s_{LO-1}$ and a second reference signal designated $s_{LO-2}$. The first reference signal and the second reference signal can be generated by maintaining a frequency spacing designated IF such that the frequency $F_{LO2}$ of the second reference signal is spaced apart from the frequency $F_{LO1}$ of the first reference signal by IF, that is to say $F_{LO2} = F_{LO1} + IF$. The first signal $s_1$ can be generated in such a way that the frequency spacing IF (also called "intermediate frequency") is maintained between the first carrier frequency $F_{c-1}$ and the frequency of the first reference signal and the frequency of the second reference signal. For example, the first signal $s_1$ can be generated such that the first carrier frequency $F_{c-1}$ is given by $F_{c-1} = F_{LO2} - IF$ or $F_{c-1} = F_{LO2} + IF$.

Figure 2:
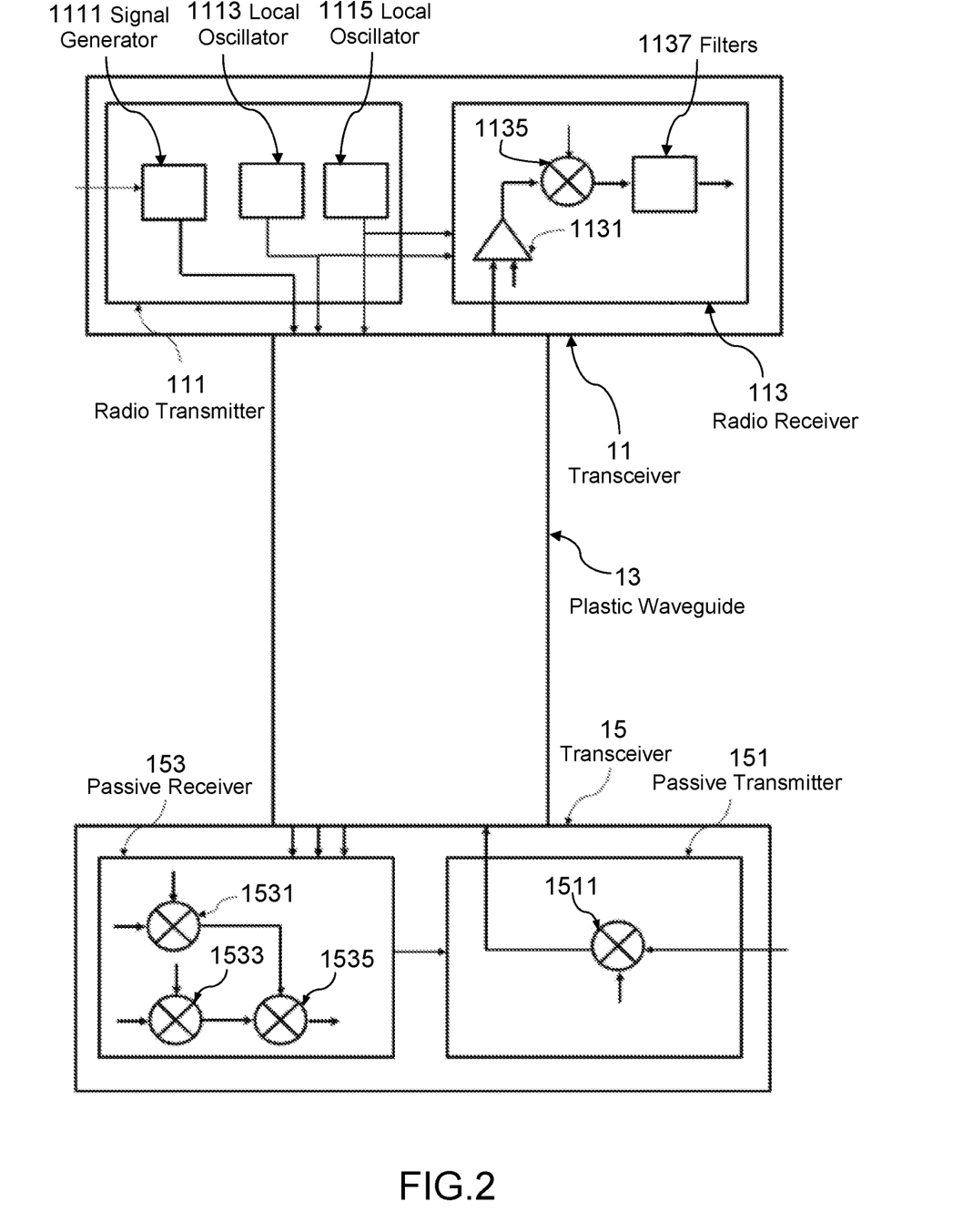
FIG. 2 is a diagram representing a system for bidirectional transmission of a plurality of signals between a first transceiver device and a second transceiver device, according to some embodiments of the invention.

FIG. 2 is a diagram representing a system for the bidirectional transmission of a plurality of signals between the first transceiver device 11 and the second transceiver device 15, according to some embodiments of the invention in which one or more reference signals generated by the multisignal power radio transmitter 111 comprise a first reference signal and a second reference signal.

Referring to FIG. 2, the multisignal power radio transmitter 111 can comprise a signal generator 1111 configured to receive the first payload carrier signal $Mod_1$ and generate the first signal $s_1$ composed of a first carrier frequency $F_{c-1}$ modulated by the first payload carrier signal $Mod_1$. The multisignal power radio transmitter 111 can further comprise a first local oscillator 1113 configured to generate the first reference signal $s_{LO-1}$ and a second local oscillator 1115 configured to generate the second reference signal $s_{LO-2}$. The millimetric radio signals generated have a sufficient power to reach the second transceiver device 15 after propagation in the plastic waveguide 13. The first reference signal and the second reference signal are also sent to the multisignal power radio receiver 113. The first reference signal and the second reference signal can be used by the passive receiver 153 to restore the first payload carrier signal.

The passive receiver 153 can be configured to receive the first signal $s_1$, the first reference signal $s_{LO-1}$ and the second reference signal $s_{LO-2}$. The passive receiver 153 can comprise passive mixers configured to determine one or more heterodyne conversion signals from the first reference signal and from the second reference signal and to perform one or more heterodyne conversions for the first signal $s_1$ by using one or more heterodyne conversion signals to restore the first payload carrier signal $Mod_1$. More specifically, referring to FIG. 2, the passive receiver 153 can comprise three passive mixers, including two passive mixers configured to determine two heterodyne conversion signals from the first reference signal and from the second reference signal, and one passive mixer configured to perform a heterodyne conversion to restore the first payload carrier signal. The first passive mixer 1531 can be configured to receive the first reference signal or the second reference signal depending on the placement of the first carrier frequency, the first passive mixer 1531 being configured to perform a first heterodyne conversion by using either the first reference signal or the second reference signal, which makes it possible to generate a first conversion signal designated $s_{c1}$=IF+Mod. The second passive mixer 1533 can be configured to determine a second heterodyne conversion signal from the first reference signal and from the second reference signal. The second heterodyne conversion signal is the product between the first reference signal and the second reference signal and is designated $s_{c2}=s_{LO2}-s_{LO-1}$. The third mixer 1535 can be configured to perform a second heterodyne conversion of the first heterodyne conversion signal by using the second heterodyne conversion signal to restore the first payload carrier signal Mod.

According to some embodiments, the passive transmitter 151 can be configured to receive a second payload carrier signal $Mod_2$ and to generate the second signal $s_2$ composed of the second carrier frequency $F_{c-2}$ modulated by the second payload carrier signal $Mod_2$. The passive transmitter 151 can be configured to generate the second signal $s_2$ through one or more direct conversions (designated "upconversions") of the second payload carrier signal $Mod_2$ by using the first reference signal and the second reference signal transmitted by the multisignal power radio transmitter 111 and received by the second transceiver device 15. Referring to FIG. 2, the passive transmitter 151 can comprise one or more passive mixers 1511 configured to receive the first reference signal and the second reference signal and determine the second signal $s_2$ by performing a direct conversion of the second payload carrier signal by using the first reference signal and the second reference signal.

After generation of the second signal $s_2$, the passive transmitter 151 can be configured to transmit the second signal $s_2$ to the first transceiver device 11 through the plastic waveguide 13. On reception of the second signal $s_2$, the multisignal power radio receiver 113 can be configured to restore the second payload carrier signal $Mod_2$ through one or more conversions of the second signal $s_2$ by using the first reference signal and the second reference signal received from the multisignal power radio transmitter 111. Referring to FIG. 2, the multisignal power radio receiver 113 can comprise a wideband low-noise amplifier 1131 of great sensitivity and high gain configured to amplify the second signal received. The multisignal power radio receiver 113 can further comprise an active mixer 1135 with conversion gain complementing the gain of the amplifier 1131 configured to perform a conversion with gain of the second signal by using the first reference signal and the second reference signal, which makes it possible to restore the second payload carrier signal. The multisignal power radio receiver 113 can further comprise a set of filters 1137 with variable gains configured to filter and amplify the second payload carrier signal restored by the active mixer 1135.

Figure 3:
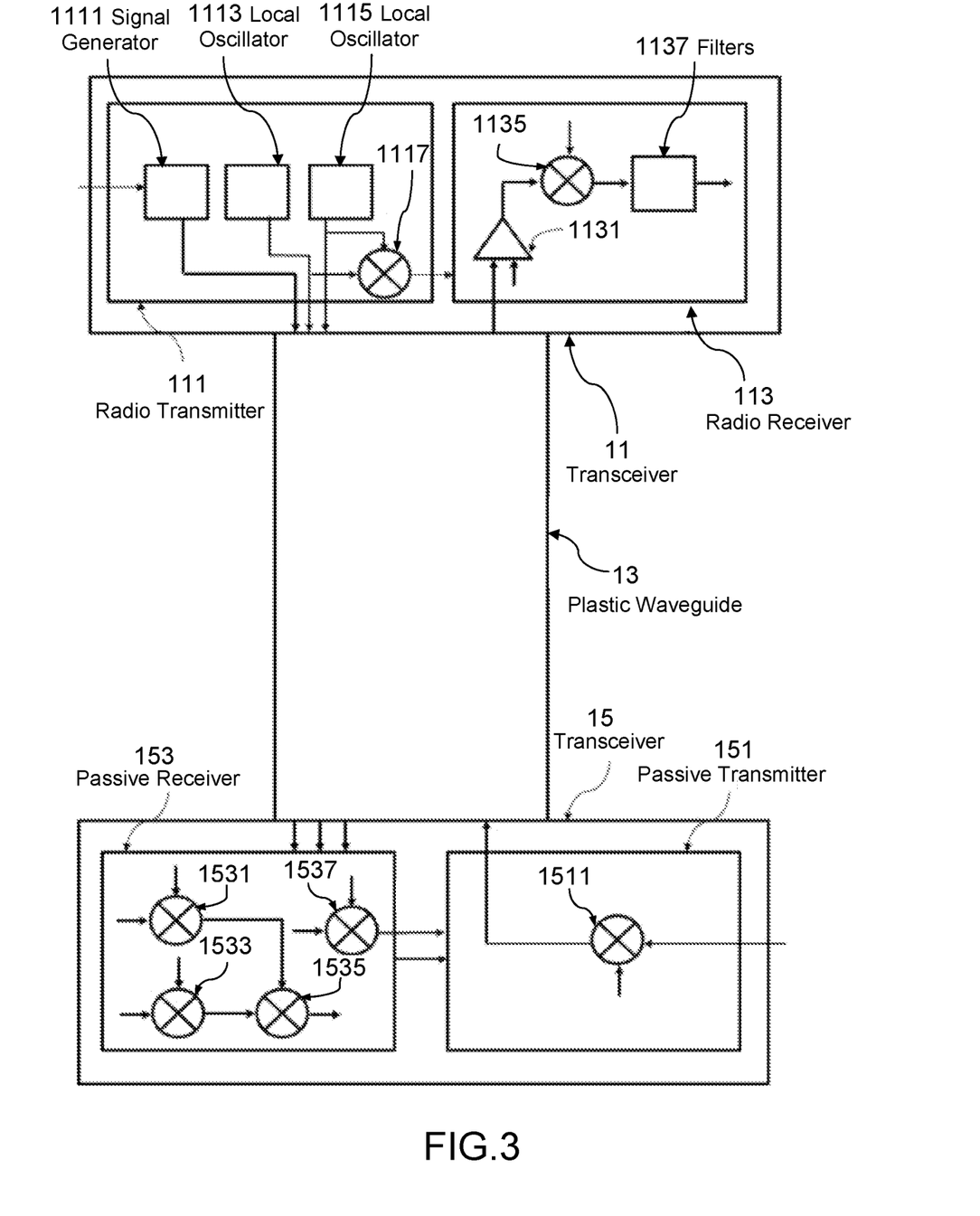
FIG. 3 is a diagram representing a system for bidirectional transmission of a plurality of signals between a first transceiver device and a second transceiver device, according to other embodiments of the invention.

FIG. 3 is a diagram representing a system for the bidirectional transmission of a plurality of signals between the first transceiver device 11 and the second transceiver device 15, according to some embodiments of the invention in which one or more reference signals generated by the multisignal power radio transmitter 111 comprise a first reference signal and a second reference signal and the generation of the second signal to the passive transmitter 151 uses a conversion signal determined from the first reference signal and from the second reference signal.

According to these embodiments, the passive receiver 153 can further comprise a passive mixer 1537 configured to determine a third reference signal designated $s_{LO-3}$ from the first reference signal and from the second reference signal, the third reference signal $s_{LO-3}$ can for example be written as being the sum of the first reference signal and of the second reference signal, $s_{LO-3}=s_{LO-1}+s_{LO2}$. The third reference signal can be used by the passive transmitter 151 to perform a heterodyne conversion to determine the second signal $s_2$.

According to some embodiments, the passive transmitter 151 can be configured to receive the third reference signal generated by the passive receiver 153. The passive transmitter 151 can comprise a mixer 1511 configured to generate the second signal $s_2$ composed of the second carrier frequency $F_{c-2}$ modulated by the second payload carrier signal through a direct conversion of the payload carrier signal by using the third reference signal $s_{LO-3}$.

According to these embodiments, the multisignal power radio transmitter 113 can further comprise a passive mixer 1117 configured to determine the third reference signal from the first reference signal and from the second reference signal. The multisignal power receiver 115 can be configured to receive the third reference signal from the multisignal power radio transmitter 113 and receive the second signal transmitted by the passive transmitter 151, the multisignal power receiver 115 can be configured to restore the second payload carrier signal through a conversion of the second signal by using the third reference signal, the conversion being performed by the active mixer 1135.

According to some embodiments, a passive mixer can be a diode passive mixer. Diodes of III-V type technology or of silicon CMOS type can be used.

In applications of the invention to a Quantum machine, the embodiments of the invention allow Qubit addressing by using a single plastic waveguide. The system 1 can be implemented in a Quantum machine in such a way that the first transceiver device 11 is located at an interface at ambient temperature and the second transceiver device 13 is located at an interface at cryogenic temperature less than or equal to 1 Kelvin. The second transceiver device 15 comprises a passive transmitter and a passive receiver, without energy consumption, which makes it possible to limit the joule losses. The distance separating the zone at ambient temperature and the zone at cryogenic temperature can be of the order of a metre. The system 1 can be used to transport the Qubit manipulation signals (in a frequency band that can range up to 20 GHz) on the ambient temperature side by using a millimetric frequency radio transmitter (frequencies of between 50 GHz and 300 GHz for example) capable of supporting a wideband of frequencies of 10 GHz and more by transmitting a signal of radiated power that is sufficient to cover the distance between the zone at ambient temperature and the zone at cryogenic temperature less than or equal to 1 Kelvin. The system 1 can further be used to return the Qubit read information from the passive transmitter at the millimetric frequencies to the receiver at ambient temperature. The carriers of the Qubit manipulation signals and of the Qubit read signals are spaced apart so as to avoid interference between the signals.

According to these embodiments, the transmission of signals from the first transceiver device 11 to the second transceiver device 15 is designated by the downloading of information from the zone at ambient temperature to the zone at cryogenic temperature. The transmission of signals from the second transceiver device 15 to the first transceiver device 11 is designated by the uploading of information from the zone at cryogenic temperature to the zone at ambient temperature.

The plurality of signals transmitted by the first transceiver device 11 to the second transceiver device can comprise one or more Qubit manipulation signals. In particular, the first payload carrier signal can be formed by a set of manipulation signals necessary to the manipulation of a predefined number of Qubits. The spectrum of the signal formed can resemble a comb of a predefined bandwidth and the Qubit manipulation signals can be generated by a multifrequency generator (not illustrated in FIGS. 1 and 2). The plurality of manipulation signals transmitted by the first transceiver device 11 is received by the passive receiver 15, the restored signal can be processed by one or more passive filters so as to separate each manipulation frequency necessary to the corresponding Qubit.

The plurality of signals transmitted by the second transceiver device 15 to the first transceiver device 11 can comprise one or more Qubit read signals. In particular, the second payload carrier signal can be formed by a set of Qubit read signals, recombined over a wide frequency band by using a passive recombiner (not illustrated in FIGS. 1 and 2).

According to some embodiments applied to a Quantum machine, the Qubit manipulation signals can form a comb-type spectrum of a width greater than or equal to 10 GHz (for example 10 GHz or 20 GHz). The Qubit manipulation signals constitute the first payload carrier signal, received at the input of the multisignal power radio transmitter 111. The first reference signal and the second reference signal can be signals that have a frequency greater than 50 GHz. For example, the first reference signal can have a frequency of 70 GHz for a frequency band of the payload carrier signal of 10 GHz and a frequency of 80 GHz for a frequency band of the payload carrier signal of 20 GHz. The second reference signal can have a frequency equal to 60 GHz for a frequency band of the payload carrier signal of 10 GHz or of 20 GHz. The first signal $s_1$ can have a frequency of 80 GHz for a frequency band of the payload carrier signal of 10 GHz and a frequency of 100 GHz for a frequency band of the payload carrier signal of 20 GHz. The third reference signal can have a frequency of 130 GHz for a frequency band of the payload carrier signal of 10 GHz and a frequency equal to 140 GHz for a frequency band of the payload carrier signal of 20 GHz. A payload carrier signal designates the Qubit manipulation signal or the Qubit read signal.

The invention is not limited to the embodiments described above by way of nonlimiting example. It encompasses all the variant embodiments which will be able to be considered by the person skilled in the art.

The invention claimed is:

1. A system for bidirectional transmission in a plastic waveguide of a plurality of signals, between a first transceiver device and a second transceiver device, wherein the system comprises:

the first transceiver device being a multisignal power radio transceiver device which comprises: a power radio transmitter
for simultaneously transmitting, in the plastic waveguide, a first signal composed of a first carrier frequency modulated by a first payload carrier signal, and one or more reference sinusoidal signals; and
a power radio receiver for receiving, via the plastic waveguide, a second signal originating from the second transceiver device;
and
the second transceiver device being a multisignal transceiver device with no energy consumption which comprises: a passive receiver
with zero energy consumption, configured to:
receive, via the plastic waveguide, the first signal transmitted by the first transceiver device;
determine one or more downconversion signals, from one or more reference sinusoidal signals received;
respectively perform one or more downconversions of said first signal received with, respectively, one or more of the downconversion signals; and
restore the first payload carrier signal;
and
a passive transmitter with zero energy consumption, configured to:
determine one or more upconversion signals from one or more of the reference sinusoidal signals received from the power radio transmitter;
respectively perform one or more upconversions of a second payload carrier signal with, respectively, one or more of the upconversion signals;
generate a second signal, said second signal being composed of a second carrier frequency modulated by said second payload carrier signal; and
transmit said second signal in the plastic waveguide.

2. The system according to claim 1, wherein the power radio transmitter of the first device comprises one or more local oscillators, each oscillator being configured to generate a reference sinusoidal signal such that a frequency spacing is maintained between the frequency of the first payload carrier signal and each of the frequencies of the reference sinusoidal signals, said frequency spacing being at least equal to the width of the frequency band of the first payload carrier signal, so as to avoid the creation of interference between the different signals transmitted simultaneously in the plastic waveguide.

3. The system according to claim 2, wherein the passive receiver of the second device comprises one or more passive mixers for determining one or more heterodyne conversion signals from one or more of the reference sinusoidal signals received and to perform, respectively, one or more heterodyne downconversions of said first signal received.

4. The system according to claim 1, wherein the power radio transmitter of the first device comprises a first local oscillator for generating a first reference sinusoidal signal and a second local oscillator for generating a second reference sinusoidal signal, and wherein the passive receiver of the second device comprises: a first passive mixer being configured to perform a first heterodyne conversion by using the first or the second reference sinusoidal signal, a second passive mixer being configured to determine a second heterodyne conversion signal from the first reference signal and from the second reference signal, and a third passive mixer being configured to perform a second heterodyne conversion of the first heterodyne conversion signal, by using the second heterodyne conversion signal so as to restore the first payload carrier signal.

5. The system according to claim 1, wherein the passive transmitter of the second device comprises one or more passive mixers for determining one or more direct conversion signals from said one or more reference sinusoidal signals received and to perform, respectively, one or more direct upconversions of a second payload carrier signal.

6. The system according to claim 1, wherein the power radio receiver of the first device is configured to:
  receive, via the plastic waveguide, said second signal transmitted by the second transceiver device;
  receive said one or said several reference sinusoidal signals generated by the power radio transmitter;
  perform one or more conversions of said second signal received with, respectively, one or more of said reference sinusoidal signals; and
  restore the second payload carrier signal.

7. The system according to claim 1, wherein the passive receiver of the second device comprises a passive mixer configured to determine a third reference sinusoidal signal from a first reference sinusoidal signal and from a second reference sinusoidal signal, said third reference sinusoidal signal being used by the passive transmitter of the second device to perform a heterodyne conversion of the second payload carrier signal and generate said second signal.

8. The system according to claim 7, wherein said third reference sinusoidal signal is used by the passive transmitter to perform a direct conversion of the second payload carrier signal and generate said second signal.

9. The system according to claim 7, wherein the passive transmitter of the second device is configured to transmit said second signal to the power radio receiver of the first device, and wherein said power radio receiver is configured to receive said third reference sinusoidal signal from the power radio transmitter and to restore said second payload carrier signal through a conversion of said second signal by using said third reference sinusoidal signal.

10. The system according to claim 1, wherein the system is implemented in a quantum machine, said first transceiver device being located at an interface at ambient temperature, said second transceiver device being located at an interface at cryogenic temperature less than or equal to 1 Kelvin, said plurality of signals comprising one or more Qubit manipulation signals and/or one or more Qubit read signals.

11. A system for bidirectional transmission in a plastic waveguide of a plurality of signals, between a first transceiver device and a second transceiver device, wherein the system comprises:
  the first transceiver device being a multisignal power radio transceiver device which comprises: a power radio transmitter for simultaneously transmitting, in the plastic waveguide, a first signal composed of a first carrier frequency modulated by a first payload carrier signal, and one or more reference sinusoidal signals;
and
  the second transceiver device being a multisignal transceiver device with no energy consumption which comprises: a passive receiver configured to receive, via the plastic waveguide, the signals transmitted by the first transceiver, and to restore the first payload carrier signal through one or more heterodyne downconversions of said first signal received by, respectively, one or more heterodyne conversion signals determined from one or more reference sinusoidal signals received.

12. A system for bidirectional transmission in a plastic waveguide of a plurality of signals, between a first transceiver device and a second transceiver device, wherein the system comprises:
  the first transceiver device being a multisignal power radio transceiver device which comprises: a power radio transmitter
    for simultaneously transmitting, in the plastic waveguide, at least one or more reference sinusoidal signals; and
    a power radio receiver for receiving, via the plastic waveguide, a second signal originating from the second transceiver device;
and
  the second transceiver device being a multisignal transceiver device with no energy consumption which furher comprises: a passive receiver
    configured to receive, via the plastic waveguide, said at least one or more reference sinusoidal signals transmitted by the first transceiver; and
    a passive transmitter configured to transmit said second signal in the plastic waveguide, said second signal being composed of a second carrier frequency modulated by a second payload carrier signal, through one or more heterodyne upconversions of said second payload carrier signal by, respectively, one or more heterodyne conversion signals determined from one or more of said reference sinusoidal signals received by said passive receiver.

* * * * *

UNITED STATES PATENT AND TRADEMARK OFFICE
CERTIFICATE OF CORRECTION

| | |
|---|---|
| PATENT NO. | : 11,588,514 B2 |
| APPLICATION NO. | : 17/399109 |
| DATED | : February 21, 2023 |
| INVENTOR(S) | : Didier Belot et al. |

It is certified that error appears in the above-identified patent and that said Letters Patent is hereby corrected as shown below:

In the Claims

In Claim 12, Column 12, Line 38 "with no energy consumption which furher comprises:" should be
-- with no energy consumption which comprises: --.

Signed and Sealed this
Sixth Day of June, 2023

Katherine Kelly Vidal
*Director of the United States Patent and Trademark Office*